Feb. 16, 1960    A. M. DAVIS    2,925,146
LUBRICATING SYSTEM
Filed Nov. 8, 1954    2 Sheets-Sheet 1

INVENTOR
Arthur M. Davis
BY
L. D. Burch
ATTORNEY

Feb. 16, 1960 A. M. DAVIS 2,925,146
LUBRICATING SYSTEM
Filed Nov. 8, 1954 2 Sheets-Sheet 2

INVENTOR
Arthur M. Davis
BY L. D. Burch
ATTORNEY

United States Patent Office 2,925,146
Patented Feb. 16, 1960

2,925,146

LUBRICATING SYSTEM

Arthur M. Davis, Islington, Ontario, Canada, assignor to General Motors Corporation, Detroit, Mich., a corporation of Delaware Application November 8, 1954, Serial No. 467,603

5 Claims. (Cl. 184—6)

This invention relates to lubricating systems and more particularly to a lubricating system adapted for use in jet engines and providing better control of the lubricating oil supply.

In some jet engines, such as those used to propel aircraft, the lubricating oil storage tank may be located within the engine, while the oil sump, pressure pump, relief valve, filter, scavenge oil tank, scavenge oil pump and other accessories are located in a separate accessory housing below the engine. Clean oil from the filter normally enters a distribution chamber or junction which has one or more outlets leading to the moving parts to be lubricated and an outlet leading to the scavenge oil tank. Separate check valves may be provided for each outlet from the distribution chamber.

Since the lubricating oil tank is located above the pressure pump, the oil head causes oil from the storage tank to seep through the clearances between the gear teeth of the pump and the pump housing and through the check valve clearances. This oil eventually passes through a bleed line to the scavenge oil tank. Though this seepage may be inconsequential for short periods of time, it is considerable over longer periods of time, as during an extended engine shut down. Considerable seepage also occurs through the clearance in the outlet to the sump during engine operation. When the oil level in the lubricating oil storage tank is checked after an extended shut down, it is discovered that the level has dropped. Too often, without realizing why the level has dropped, oil is added to bring the level up, in which case a dangerous condition is created. When the engine is started, the outlet from the distribution chamber to the scavenge oil tank is normally closed by the check valve provided therefor, and the scavenge oil pump returns the scavenged oil to the lubricating oil storage tank. Obviously, since excess oil is now present in the system, the proper level in the storage tank is exceeded and the excess oil is forced out of the system, as through the vented filler tube, and onto the engine. This condition is obviously extremely hazardous and cannot be tolerated.

It is now provided a lubricating system for such an engine having a check valve in the distribution chamber which will remain positively closed and prevent seepage regardless of clearances between the parts of the pump and the valve so that oil cannot enter the distribution chamber when the engine is not operating. It is further proposed to provide a lubricating system having a double-acting positively-sealing check valve associated therewith which further increases the control of the lubricating oil supply. Thus, whenever the lubricating oil pressure is sufficient to open the inlet to the distribution chamber, as when the engine is operating, the outlet from the chamber to the scavenge oil tank will be positively closed at the same time, so that seepage to the scavenge oil tank during engine operation cannot occur. When the engine is stopped, the inlet to the distribution chamber will be automatically and positively closed so that the oil head alone cannot cause oil to seep between the gear teeth of the pressure pump and the pump housing and into the distribution chamber. At the same time, the outlet to the scavenge oil tank may be opened, at least to the extent that seepage may occur.

This is accomplished by a novel construction of the distribution chamber in the lubricating system permitting the use of a single double-acting valve having separate resilient seals on opposite ends thereof so that seepage occurring through clearances between parts will be prevented.

Figure 1:
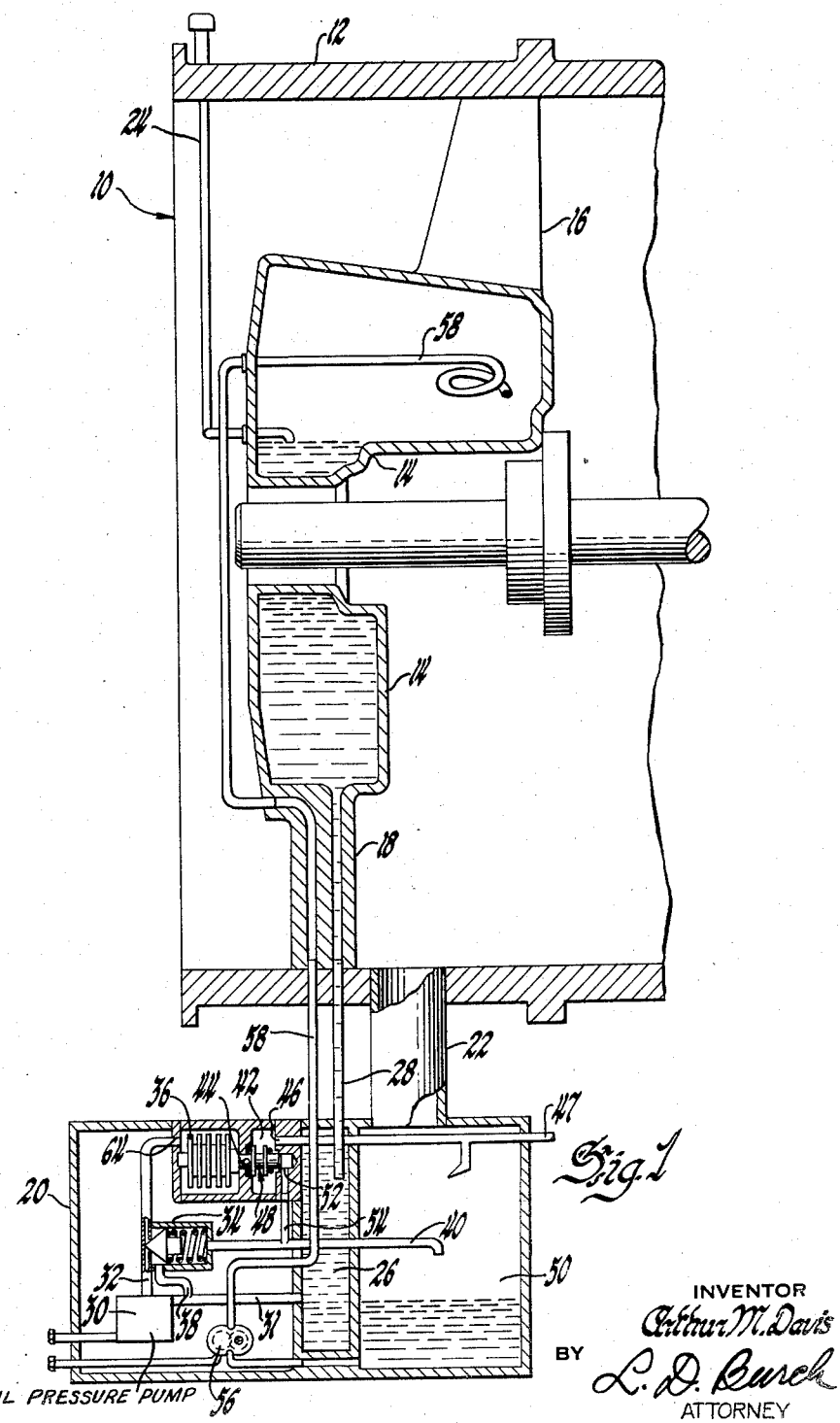
Figure 1 is a fragmentary cross-sectional view of a jet engine illustrating a lubricating system embodying the invention.

Referring to the drawings in more detail, and to Figure 1 in particular, a jet engine 10 embodying the invention comprises a stationary annular outer shell 12, an annular lubricating oil tank 14 secured to the outer shell 12 by means of a plurality of radial members 16 and support member 18, and an accessory housing 20 secured to outer shell 12 by means of member 22. Tank 14 is filled through filler tube 24 and supplies oil to sump 26 through conduit 28. Oil pressure pump 30 of the meshing gear type draws oil from sump 26 through conduit 31 and discharges the oil through conduit 32, past oil pressure relief valve 34 and through oil filter 36. Conduits 38 and 40 relieve excess pressure through relief valve 34. When the engine is operating and check valve 48 is open, clean oil from filter 36 enters distribution chamber 42 through inlet 44 and leaves chamber 42 through outlet 46 and conduit 47 leading to the parts being lubricated. When the engine is not operating and check valve 48 is closed, any oil in chamber 42 may drain into scavenge oil tank 50 by way of outlet 52 and conduits 54 and 40. Scavenge pump 56 delivers scavenge oil from scavenge oil tank 50 by way of conduit 58 back to lubricant oil tank 14.

Figure 2:
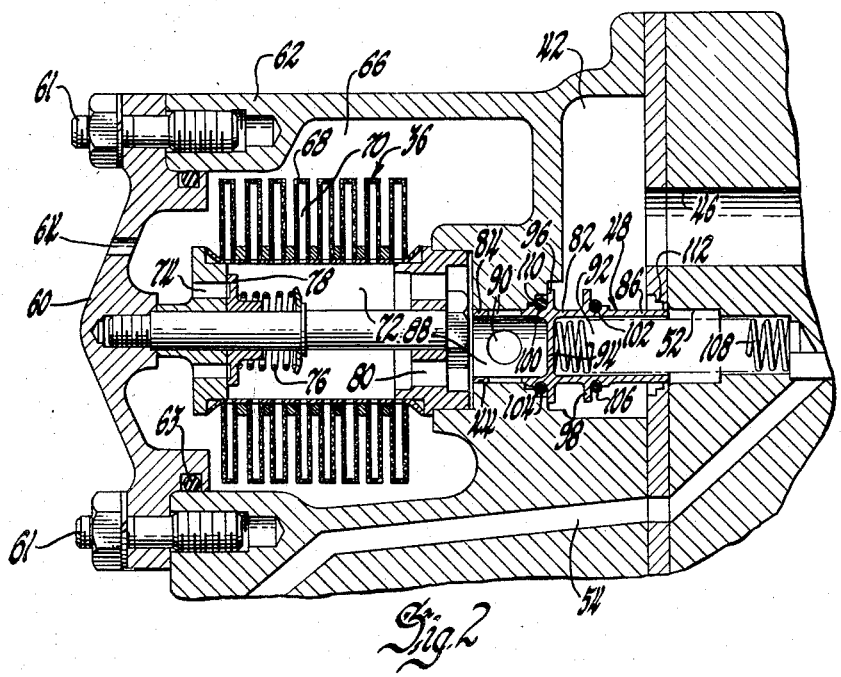
Figure 2 is a fragmentary cross-sectional view illustrating in greater detail the filter and distribution chamber assembly shown by Figure 1.

Figure 2 illustrates a filter and distribution chamber assembly in which the cover 60 may be secured to housing 62 by bolts 61. Seal 63 is preferably provided between the cover 60 and the housing 62, and the cover 60 is provided with the inlet passage 64 to admit oil into chamber 66. Normally, oil is forced by pump 30 through spaced hollow filter elements 68, into chambers 70 and into clean oil chamber 72. If the filter elements 68 become clogged, the unfiltered oil may pass through passages 74 by compressing spring 76 through pressure on plate 78. From clean oil chamber 72 clean oil passes through passage 80 which communicates with distribution chamber 42 through inlet 44.

Figure 3:
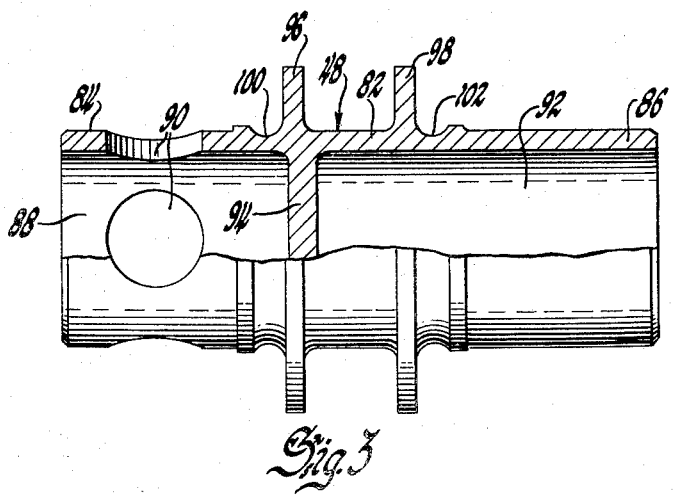
Figure 3 is an elevational view partly in cross-section of the body of the check valve shown by Figures 1 and 2.

Referring now to Figures 2 and 3, the check valve 48 may comprise a cylindrical body 82 having free ends 84 and 86. End 84 may be formed to provide an axial bore 88 and circumferentially spaced radial apertures 90, while end 86 may be formed to provide an axial bore 92 separated from axial bore 88 by wall 94. Spaced radial flanges 96 and 98 have annular grooves 100 and 102 adjacent thereto for receiving resilient O-ring seals 104 and 106 respectively. Except for weight and other considerations, flanges 96 and 98 could be replaced by a single annular ring. End 84 is receivable in inlet 44 and end 86 is receivable in outlet 52. Valve 48 is slidable axially in inlet 44 and outlet 52 from the extreme left hand or closed position of inlet 44 shown by Figure 2 to the extreme right hand or open position of inlet 44 against the compression of spring 108 in bore 92 by engine operating oil pressure in bore 88 against wall 94. Spring 108 is sufficiently strong to overcome oil head pressure when the engine is not operating. O-rings 104 and 106 provide a positive seal between flanges 96 and 98 and shoulders 110 and 112 respectively, depending upon the position of valve 48, so that unobstructed seepage of oil through the clearances between these parts is prevented. It will be noted that the spacing of flanges 96 and 98 is such that when apertures 90 are totally free of the walls of aperture 44, the valve 48 is at full right hand position so that O-ring 106 seals off the outlet 52 from distribution chamber 42. This prevents seepage to the scavenge oil tank when the engine is in operation.

From the above specification and drawings it is apparent that there has been provided a novel lubricating system which overcomes the above objections to present day jet engine lubricating systems. It is equally apparent that the invention, though particularly adapted for use in a jet engine lubricating system, may be adapted for any application where a problem of similar nature exists without departing from the scope thereof.

The claims:

1. In a lubricating system having lubricating oil scavenging, pumping, and distribution means and a lubricating oil storage tank disposed above the lubricating oil scavenging, pumping, and distribution means, a distribution chamber having an inlet passage from said pumping means and an outlet passage to said scavenging means, and a single double-acting check valve extending between and slidably receivable within said inlet and said outlet passages, said check valve comprising a tubular body having spaced resilient members thereon positively to close one of said passages while opening the other of said passages, said valve being resiliently biased to the closed inlet passage position thereof for opening by a predetermined lubricating oil pressure.

2. In a lubricating system having lubricating oil scavenging, pumping, and distribution means, and a lubricating oil storage tank disposed above the lubricating oil scavenging, pumping, and distribution means, and subject to seepage of lubricating oil through the clearances between cooperating parts thereof, a distribution chamber having an inlet passage from said pumping means and an outlet passage to said scavenging means, and a single double-acting check valve extending between and slidably receivable within said inlet and said outlet passages, said check valve comprising a tubular body having spaced resilient members thereon positively to close one of said passages while opening the other of said passages and to prevent said seepage, said valve being resiliently biased to the closed inlet passage position thereof for opening by a predetermined lubricating oil pressure.

3. In a lubricating system, the combination of lubricating oil pumping, scavenging and distribution means, said distribution means including a distribution chamber having an inlet passage from said pumping means and outlet passages to said scavenging means and to the parts to be lubricated, and a single check valve extending between and slidably receivable within said inlet passage and said outlet passage to said scavenging means, said check valve comprising an elongated body having spaced resilient sealing elements thereon to close said inlet passage and open said outlet passage in the closed position of said valve and to open said inlet passage and close said outlet passage in the open position thereof.

4. An engine lubricating system comprising, in combination, a lubricating oil supply pump having an inlet and an outlet, a lubricating oil tank connected to the inlet of the pump and extending above the pump so that static head of oil in the tank tends to cause flow of oil from the tank through the pump, means defining a distributing chamber having an inlet connected to the outlet of the pump and a first outlet connected to the engine to supply oil thereto, a scavenge oil tank connected to the engine to receive oil therefrom, the distributing chamber having a second outlet aligned with the inlet thereto and connected to the scavenge oil tank, a valve member reciprocably mounted in the distributing chamber inlet and second outlet and reciprocable between a first position sealing the inlet and opening the second outlet and a second position opening the inlet and sealing the second outlet, and means yieldably biasing the valve member to the first position with sufficient force to overcome the static head of oil from the supply tank but insufficient force to overcome the oil pressure generated by the oil supply pump when the pump is operating, the pump pressure when the pump is operating moving the valve member to the second position.

5. An engine lubricating system comprising, in combination, a lubricating oil supply pump having an inlet and an outlet, a lubricating oil tank connected to the inlet of the pump and extending above the pump so that static head of oil in the tank tends to cause flow of oil from the tank through the pump, means defining a distributing chamber having an inlet connected to the outlet of the pump and a first outlet connected to the engine to supply oil thereto, a scavenge oil tank connected to the engine to receive oil therefrom, the distributing chamber having a second outlet aligned with the inlet thereto and connected to the scavenge oil tank, a valve member seatable alternately against the distributing chamber inlet and second outlet and movable between a first position sealing the inlet and opening the second outlet and a second position opening the inlet and sealing the second outlet, and means yieldably biasing the valve member to the first position with sufficient force to overcome the static head of oil from the supply tank but insufficient force to overcome the oil pressure generated by the oil supply pump when the pump is operating, the pump pressure when the pump is operating acting against the valve member to move the valve member to the second position.

References Cited in the file of this patent

UNITED STATES PATENTS

| | | |
|---|---|---|
| 1,997,700 | Short | Apr. 16, 1935 |
| 2,071,913 | Bentley | Feb. 23, 1937 |
| 2,134,237 | Saulnier | Oct. 25, 1938 |
| 2,197,247 | Bijur | Apr. 16, 1940 |
| 2,336,480 | Grantz | Dec. 14, 1943 |
| 2,458,763 | Birmann | Jan. 11, 1949 |
| 2,610,859 | Wilcox | Sept. 16, 1952 |
| 2,633,147 | Badami | Mar. 31, 1953 |
| 2,706,487 | Wilson | Apr. 19, 1955 |

FOREIGN PATENTS

| | | |
|---|---|---|
| 467,576 | Canada | Aug. 22, 1950 |
| 676,479 | Great Britain | July 30, 1952 |